United States Patent
Abdulrazzaq

(10) Patent No.: US 11,331,174 B2
(45) Date of Patent: May 17, 2022

(54) OVERDENTURE WITH HORIZONTAL IMPLANT

(71) Applicant: Rusul Abdulrazzaq, Toronto (CA)

(72) Inventor: Rusul Abdulrazzaq, Toronto (CA)

( * ) Notice: Subject to any disclaimer, the term of this patent is extended or adjusted under 35 U.S.C. 154(b) by 0 days.

(21) Appl. No.: 17/103,070

(22) Filed: Nov. 24, 2020

(65) Prior Publication Data
US 2021/0153988 A1 May 27, 2021

Related U.S. Application Data

(60) Provisional application No. 62/940,199, filed on Nov. 25, 2019.

(51) Int. Cl.
*A61C 13/271* (2006.01)
*A61C 13/235* (2006.01)
*A61C 8/00* (2006.01)

(52) U.S. Cl.
CPC ............. *A61C 13/26* (2013.01); *A61C 8/001* (2013.01); *A61C 13/235* (2013.01)

(58) Field of Classification Search
CPC ..... A61C 8/0081; A61C 8/0009; A61C 8/003; A61C 8/0028; A61C 8/0027; A61C 8/0031; A61C 8/0095; A61C 8/0086; A61C 13/235; A61C 13/26; A61C 13/265; A61C 13/2653; A61C 13/2656; A61C 13/267; A61C 8/001; A61B 17/8071
See application file for complete search history.

(56) References Cited

U.S. PATENT DOCUMENTS

| | | | | |
|---|---|---|---|---|
| 2,714,764 A * | 8/1955 | Mandelbaum | ....... | A61C 8/0009 433/173 |
| 3,618,212 A * | 11/1971 | Weissman | ............. | A61C 13/30 433/174 |
| 4,431,416 A * | 2/1984 | Niznick | ............... | A61C 8/0018 433/174 |
| 4,741,698 A * | 5/1988 | Andrews | ............. | A61C 8/0031 433/173 |
| 5,201,736 A * | 4/1993 | Strauss | ............. | A61B 17/8071 433/173 |
| 2018/0161129 A1* | 6/2018 | Mommaerts | ......... | A61C 8/0031 |
| 2020/0222158 A1* | 7/2020 | Coreil | ................ | A61C 13/2656 |

* cited by examiner

*Primary Examiner* — Edward Moran
(74) *Attorney, Agent, or Firm* — Law Office of Matthew M Yospin; Matthew M. Yospin

(57) ABSTRACT

Apparatus is provided for overdenture with horizontal implant. The apparatus presented comprises an overdenture and a horizontal implant. The horizontal implant is surgically implanted onto the patient's maxilla or mandible, typically on the outside of the bone. The overdenture and the horizontal implant have attachment components which couple together to attach the overdenture to the horizontal implant. The attachment components may comprise ball-and-socket attachments, with the ball components affixed to the overdenture and the socket components affixed to the horizontal implants. The present invention solves problems with currently available dental implants and overdentures.

17 Claims, 11 Drawing Sheets

OVERDENTURE WITH HORIZONTAL IMPLANT

FIELD OF THE INVENTION

The presently disclosed subject matter relates to providing apparatus for dentures, and more particularly, to apparatus for dentures using an overdenture with horizontal implant.

BACKGROUND OF THE INVENTION

An overdenture, meaning a dental prosthesis that is removable, typically rests on or is attached to one or more remaining natural teeth, or to the roots of natural teeth, and/or to one or more dental implants. Dental implants are traditionally implanted vertically, meaning either up into the maxilla or down into the mandible, along the vertical axis parallel to which teeth and their roots are typically oriented, at least in approximate orientation. In the prior art, a dental implant may often require a bone graft, and can be difficult for patients with a resorbed ridge. Prior art dental implants and overdenture may not effectively help rebuild the bone (either the maxilla or the mandible) or prevent further bone resorption.

Furthermore, the prior art of dental implants and overdenture in many cases are not suitable for patients with tori, that is, bony growths in the maxilla or the mandible. The prior art typically require extensive amounts of time for the patient to heal, often 12 months or more. The prior art typically require or involve palatal coverage, which interferes with the patient's ability to eat and taste food and drink. Traditional, prior art, overdenture are often regarded as not comfortable when eating, largely because patients must bite on the bony upper edge of the mandible or lower edge of the maxilla. Additionally, in prior art overdenture and dental implants, the biting and chewing force is transferred directly onto the implant, which can lead to patient discomfort and/or complications with the implant, which complications may be related to occlusion overloads (being an overload of the occlusal force, the muscular force applied on teeth and opposing teeth, when a patient bites, which can lead to breakage of teeth), or to other factors or causes. Prior art dentures can also negatively impact how a patient speaks, looks, and talks, by interfering with the movement and location of the mouth, lips, and tongue, leading to discomfort and patient dissatisfaction.

SUMMARY OF THE INVENTION

The present invention meets all these needs, by disclosing apparatus that comprises a horizontally-placed dental implant with components for attaching overdenture. The apparatus, in most cases, doesn't require a bone graft, and can offer advantages for patients with resorbed ridges. The apparatus can also help rebuild the bone (maxilla or mandible), and/or help prevent further bone resorption. Unlike the prior art, the apparatus can be used with patients with tori.

The apparatus can require less healing time than prior art devices. Furthermore, the apparatus does not require palatal coverage, which offers an advantage to patients in that the patient will be able to eat and taste better. The apparatus presents improvements in patient comfort when eating, because patients will not need to bite directly onto the bone in the same way as with prior art dental implants and overdenture. Additionally, because of the components for attaching overdenture that may be used with the horizontally-placed dental implant, the overdenture can move with the movement of the patient's mouth in chewing and biting without direct force on the dental implant, leading to advantages in patient comfort and use. Because the apparatus may be placed only on the sides of the bones of the patient's mouth, as opposed to in the anterior of the mouth of the patient, the overdenture and apparatus as a whole present further advantages over prior art in that the patient can speak, look, and talk more normally, that is, like a person who does not have dentures.

In one aspect, the present invention comprises a plurality of overdentures and a plurality of horizontal implants, in which: the plurality of overdentures further comprises overdenture-attachment components; and the plurality of horizontal implants comprises a plurality of posts, and a plurality of post-connection components; and a plurality of implant-attachment components is affixed to the plurality of horizontal implants at the plurality of post-connection components.

In one aspect, the present invention comprises an apparatus in which the plurality of post-connection components comprise each post from the plurality of posts having a post end, comprising a plurality of post ends; and a bar joining at least one such post to at least one other such post from the plurality of posts.

In one aspect, the present invention comprises an apparatus further comprising a plate having a plurality of holes, and in which the plurality of post-connection components comprise each post from the plurality of posts being passed through the plurality of holes and attached to the implant-attachment components.

In one aspect, the present invention comprises an apparatus in which the overdenture-attachment components comprise ball components, with each of a plurality of ball components affixed to the overdenture with a handle.

In one aspect, the present invention comprises an apparatus in which the plurality of implant-attachment components comprise socket components that couple with the ball components.

In one aspect, the present invention comprises an apparatus in which each of the plurality of ball components have an elastic attachment connecting each of the plurality of ball components to the overdenture.

In one aspect, the present invention comprises an apparatus in which the elastic attachment is disposed to be passed through the handle, and wherein the handle is hollow.

In one aspect, the present invention comprises an apparatus in which each handle is attached directly to the overdenture.

In one aspect, the present invention comprises an apparatus in which each handle is attached to an anchor, and wherein the anchor is attached to the overdenture.

In one aspect, the present invention comprises an apparatus in which the overdenture-attachment components comprise attachment means, and wherein the attachment means are attached with a handle to the overdenture.

In one aspect, the present invention comprises an apparatus in which the overdenture-attachment components are posts.

In one aspect, the present invention comprises an apparatus in which the overdenture-attachment components among the plurality of overdenture-attachment components comprise a plurality of manufactures.

In one aspect, the present invention comprises an apparatus in which: the plurality of implant-attachment components have approximate dimensions of length of 4-6 mm, width of 2-3 mm, and depth of 1-2 mm; and a distance between each of the plurality of posts is approximately 2-3 mm; and each horizontal implant is approximately 17 mm in its largest extent; and the ball components are approximately spheres, of approximately 1-3 mm in diameter; and each handle 138 is approximately 1-2 mm in length.

In one aspect, the present invention comprises an apparatus in which the ball components and the implant-attachment components connect to each other in a manner that is both mechanically secure, and magnetically, such that the ball components and the implant-attachment components are magnetically attracted to each other and are reversibly secured to each other via magnetism.

In one aspect, the present invention comprises an apparatus in which the overdenture moves with a movement of a mouth of a patient in chewing without direct force on the posts of the horizontal implant, as the movement of the ball components in, and relative to, the implant-attachment components has a plurality of occlusion forces transmitted through the components of the horizontal implant.

In one aspect, the present invention comprises an overdenture and a horizontal implant, in which: the overdenture further comprises overdenture-attachment components, which further comprise a plurality of ball components, with each of the plurality of ball components affixed to the overdenture; and the horizontal implant is horizontally placed, and the horizontal implant comprises at least two posts, each post from the plurality of posts being attached to a plurality of post-connection components; and a plurality of implant-attachment components affixed to the horizontal implant at the plurality of post-connection components; and wherein the implant-attachment components are oriented so that they can be reversibly engaged with the overdenture-attachment components.

In one aspect, the present invention comprises an apparatus in which: the plurality of implant-attachment components have approximate dimensions of length of 4-6 mm, width of 2-3 mm, and depth of 1-2 mm; and a distance between each of the plurality of posts is approximately 2-3 mm; and each horizontal implant is approximately 17 mm in its largest extent; and the ball components are approximately spheres, of approximately 1-3 mm in diameter; and each handle 138 is approximately 1-2 mm in length.

In one aspect, the present invention comprises an apparatus in which the ball components and the implant-attachment components connect to each other in a manner that is both mechanically secure, and magnetically, such that the ball components and the implant-attachment components are magnetically attracted to each other and are reversibly secured to each other via magnetism.

In one aspect, the present invention comprises an apparatus in which the overdenture moves with a movement of a patient's mouth in chewing without direct force on the posts of the horizontal implant, as the movement of the ball components in, and relative to, the implant-attachment components has a plurality of occlusion forces transmitted through the components of the horizontal implant.

In one aspect, the present invention comprises a plurality of overdentures and a plurality of horizontal implants, in which: the overdenture further comprises overdenture-attachment components; and the horizontal implant is horizontally placed, and the horizontal implant comprises a plurality of posts; a plurality of post-connection components; and a plurality of implant-attachment components affixed to the horizontal implant at the plurality of post-connection components; and wherein the implant-attachment components are oriented so that they can be reversibly engaged with the overdenture-attachment components; wherein the partial overdenture or the complete overdenture is customized to a patient, in a number of horizontal implants used which comprise the plurality of horizontal implants, the number of posts in each of any number of horizontal implants, and a horizontal extent of the overdenture used for the patient.

In one aspect, the present invention comprises an apparatus in which, for the patient for whom the overdenture replaces teeth on a side of a maxilla or a mandible of the patient, the horizontal implant is placed only on the sides of the maxilla or mandible.

In one aspect, the present invention comprises an apparatus in which: the implant-attachment components have approximate dimensions of length of 4-6 mm, width of 2-3 mm, and depth of 1-2 mm; and a distance between each of the plurality of posts is approximately 2-3 mm; and each horizontal implant is approximately 17 mm in its largest extent; and the overdenture-attachment components further comprise a plurality of ball components, and wherein the ball components are approximately spheres, of approximately 1-3 mm in diameter; and each handle 138 is approximately 1-2 mm in length; and the ball components and the implant-attachment components connect to each other in a manner that is both mechanically secure, and magnetically, such that the ball components and the implant-attachment components are magnetically attracted to each other and are reversibly secured to each other via magnetism.

These aspects of the present invention, and others disclosed in the Detailed Description of the Drawings, represent improvements on the current art. This summary is provided to introduce a selection of concepts in a simplified form that are further described below in the Detailed Description of the Drawings. This Summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of various aspects, is better understood when read in conjunction with the appended drawings. For the purposes of illustration, the drawings show exemplary aspects; but the presently disclosed subject matter is not limited to the specific methods and instrumentalities disclosed. In the drawings, like reference characters generally refer to the same components or steps of the device throughout the different figures. In the following detailed description, various aspects of the present invention are described with reference to the following drawings, in which.

DETAILED DESCRIPTION OF THE DRAWINGS

The presently disclosed invention is described with specificity to meet statutory requirements. But, the description itself is not intended to limit the scope of this patent. Rather, the claimed invention might also be configured in other ways, to include different steps or elements similar to the ones described in this document, in conjunction with other present or future technologies. Moreover, although the term "step" or similar terms may be used herein to connote different aspects of methods employed, the term should not be interpreted as implying any particular order among or between various steps herein disclosed unless and except when the order of individual steps is explicitly described. The word "approximately" as used herein means within 5% of a stated value, and for ranges as given, applies to both the start and end of the range of values given.

In the following description, numerous specific details are set forth to provide a thorough understanding of the invention. But, the present invention may be practiced without these specific details. Structures and techniques that would be known to one of ordinary skill in the art have not been shown in detail, in order not to obscure the invention. Referring to the figures, it is possible to see the various major elements constituting the apparatus and methods of use the present invention.

The present invention comprises an apparatus 100 for overdenture with horizontal implant.

Figure 10:
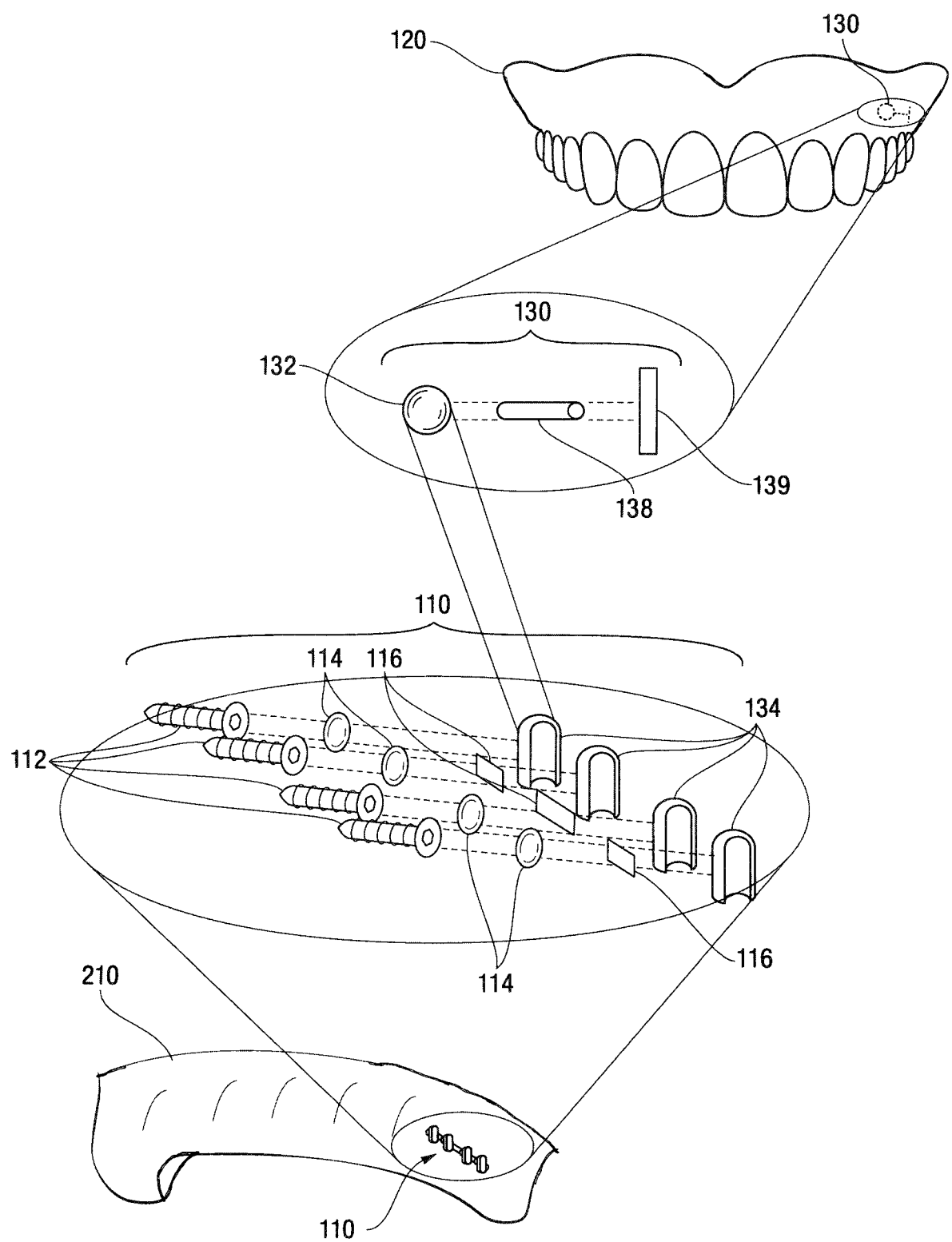
FIG. 10 shows an exploded perspective view of an aspect of the present invention.
Figure 11:
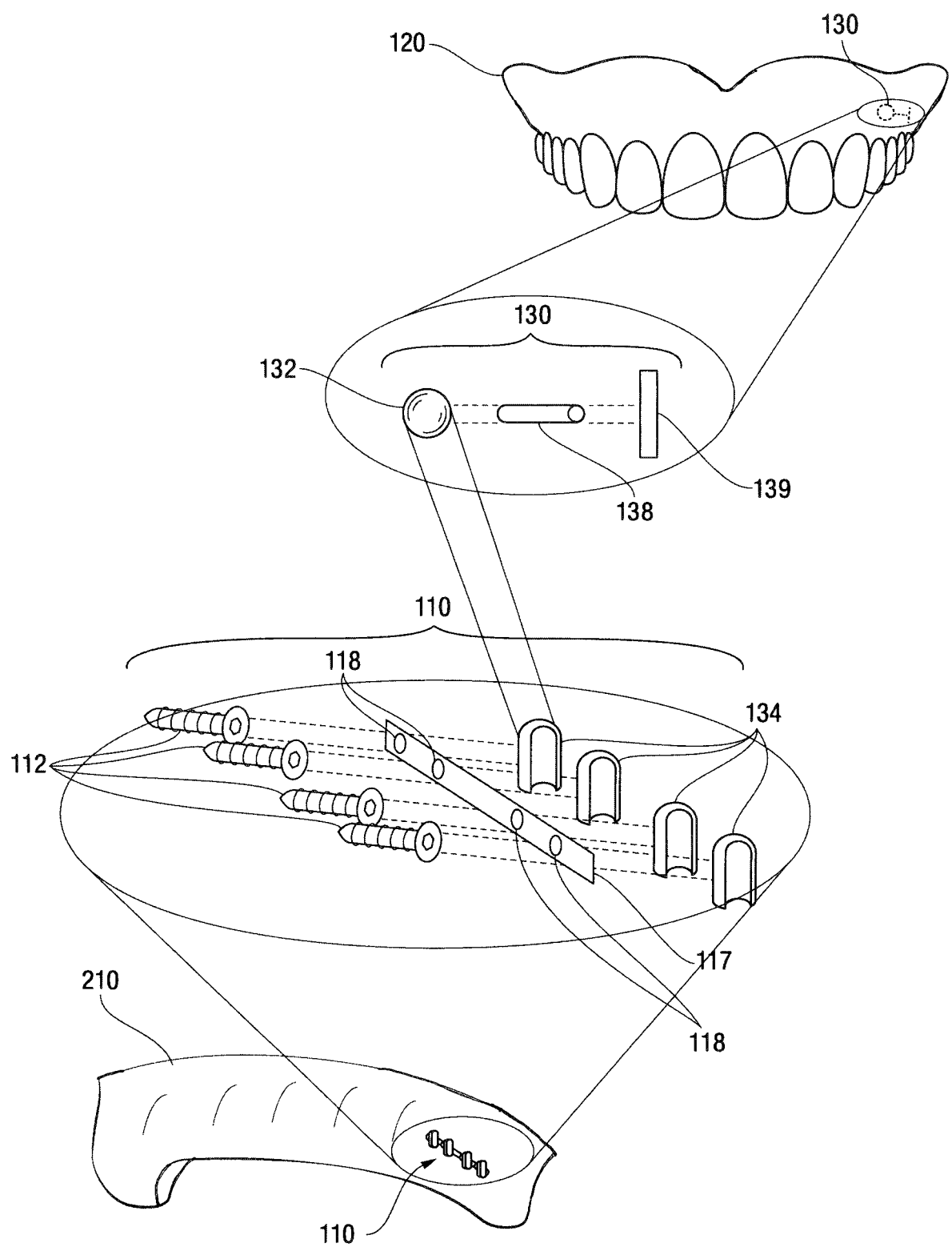
FIG. 11 shows an exploded perspective view of an aspect of the present invention.

With reference to FIG. 1, FIG. 2, FIG. 3, FIG. 4, FIG. 5, FIG. 6A, and FIG. 6B, the apparatus 100 of the present invention comprises a plurality of horizontal implants 110 and a plurality of overdentures 120. The plurality of horizontal implants 110 comprises a plurality of posts 112, and a plurality of post-connection components. In some aspects of the apparatus 100, as shown in FIG. 10, the plurality of post-connection components comprise: each post 112 from the plurality of posts 112 having or being joined to a post end 114, the post ends 114 comprising a plurality of post ends 114; and a bar 116 joining at least one such post 112 to at least one other such post 112 from the plurality of posts 112. In some aspects of the apparatus 100, as shown in FIG. 11, the plurality of post-connection components comprise: each post 112 from the plurality of posts 112 being adjacent to a plate 117 and/or passed through a plate 117, specifically the plate 117 having a plurality of holes 118 and each of the posts 112 being passed through one of the plurality of holes 118, such that the plate 117 joins or links the plurality of posts 112; and wherein the plurality of posts 112 are then attached, at the plurality of post ends 114, to a plurality of implant-attachment components 134. In some aspects of the present disclosure, the plate 117 may be solid other than the holes 118, or in other aspects the plate 117 might be a mesh or lattice, or other form. In some aspects of the apparatus 100, the plurality of post-connection components comprise: each post 112 from the plurality of posts 112 being attached to the plate 117, the plate 117 joining the plurality of posts 112, and the plurality of implant-attachment components 134 being attached to the plate 117, such that the plate 117 joins or links the plurality of posts 112. In other aspects of the apparatus 100, the plurality of post-connection components may comprise another implementation, now known or later invented. In some aspects of the apparatus 100, the plurality of posts 112 comprises at least two posts 112.

Figure 8A:
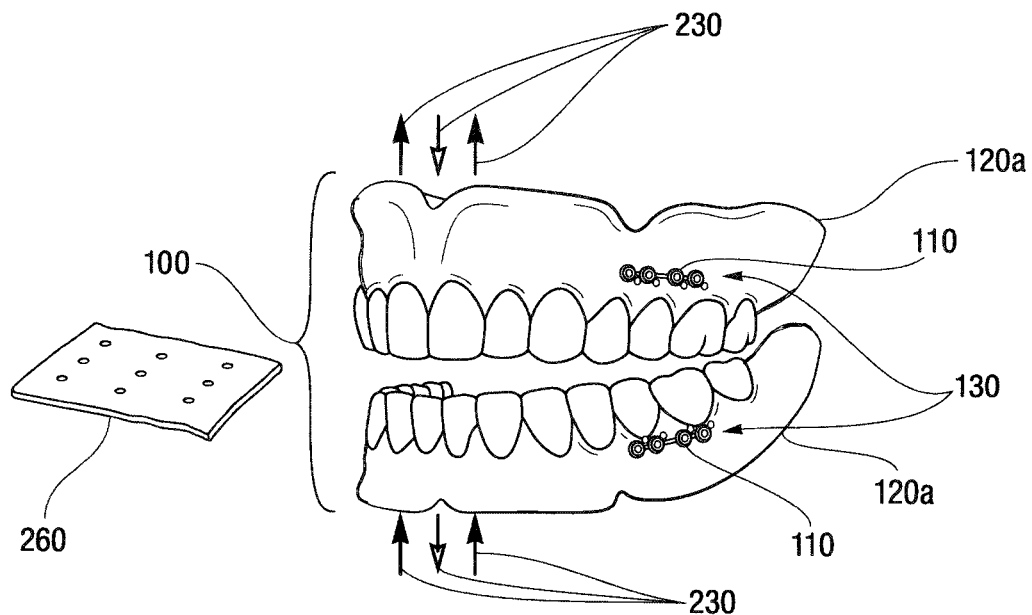
FIG. 8A and FIG. 8B show elevation views of an aspect of an overdenture of the present invention implanted into place on a patient with a horizontal implant implanted, illustrating the motion of biting with the overdentures of the present invention.
Figure 8B:
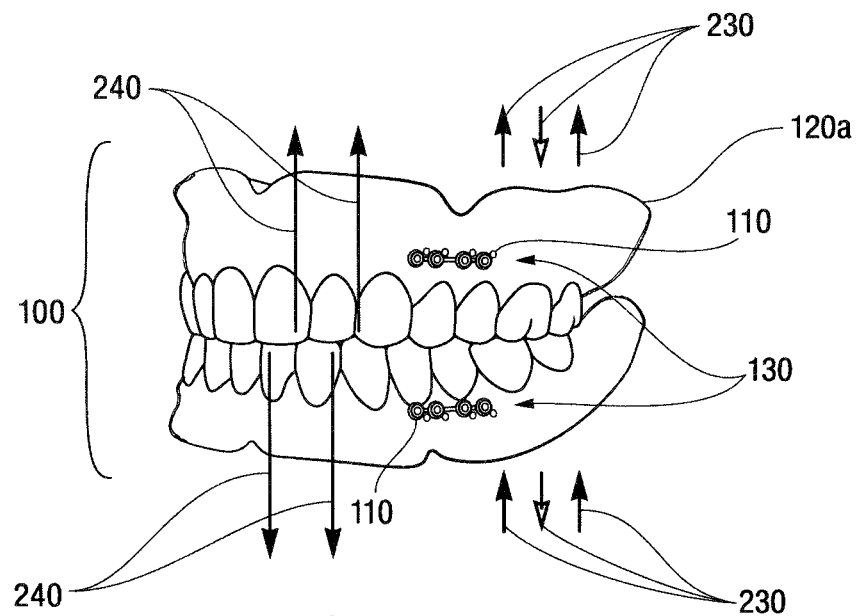
Figure 9A:
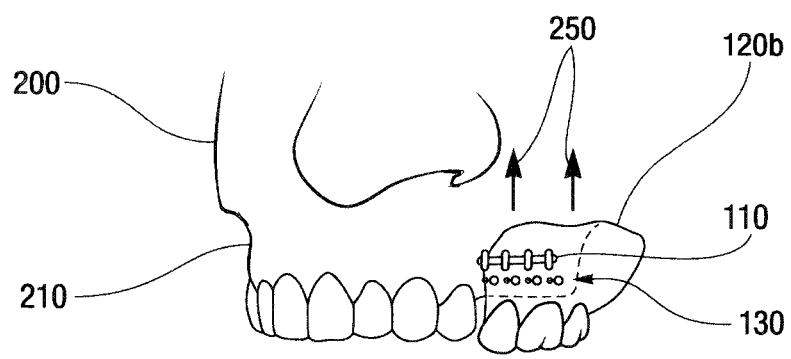
FIG. 9A and FIG. 9B show front elevation views of an aspect of an overdenture and horizontal implant of the present invention, showing use with a partial overdenture.
Figure 9B:
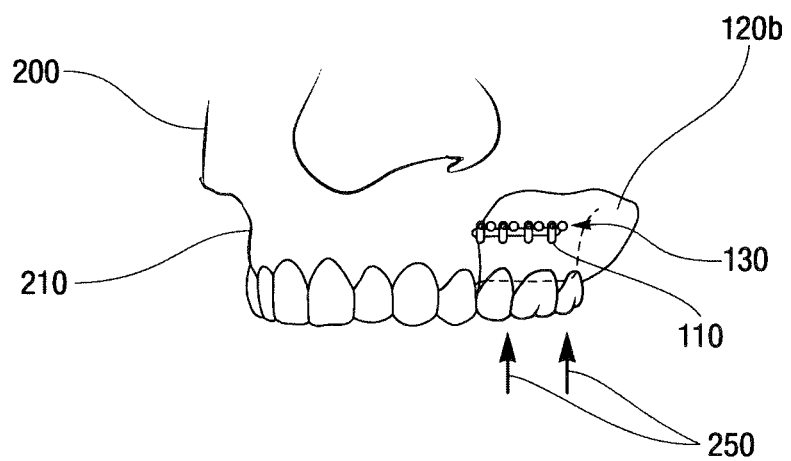

The overdenture 120 further comprises overdenture-attachment components 130, which overdenture-attachment components 130 may comprise ball-and-socket attachments, with the ball components 132 of the ball-and-socket attachments affixed to the overdenture 120 with a handle 138, as depicted in FIG. 4, FIG. 6A, FIG. 6B, FIG. 7A, FIG. 7B, FIG. 9A, FIG. 9B, FIG. 10, and FIG. 11. The horizontal implant 110 comprises implant-attachment components 134 affixed to the horizontal implant 110 at the plurality of post-connection components, which may be the post end 114 or the plate 117 or the post end 114 passed through or attached through the holes 118 in the plate 117, to affix the post end 114 to the implant-attachment components 134; the implant-attachment components 134 may comprise socket components that couple with the ball components 132. In some aspects of the apparatus 100, the implant-attachment components 134 may be shaped approximately as circles, as shown in FIG. 8A and FIG. 8B. In some aspects of the apparatus 100, the implant-attachment components 134 may be shaped approximately as U-shaped, i.e. elongated or oblong, as shown in FIG. 1, FIG. 2, FIG. 3, FIG. 7A, FIG. 7B, FIG. 9A, FIG. 9B, FIG. 10, and FIG. 11. In other aspects of the apparatus 100, the implant-attachment components 134 may have another shape, as will be apparent to one of skill in the art.

Figure 1:
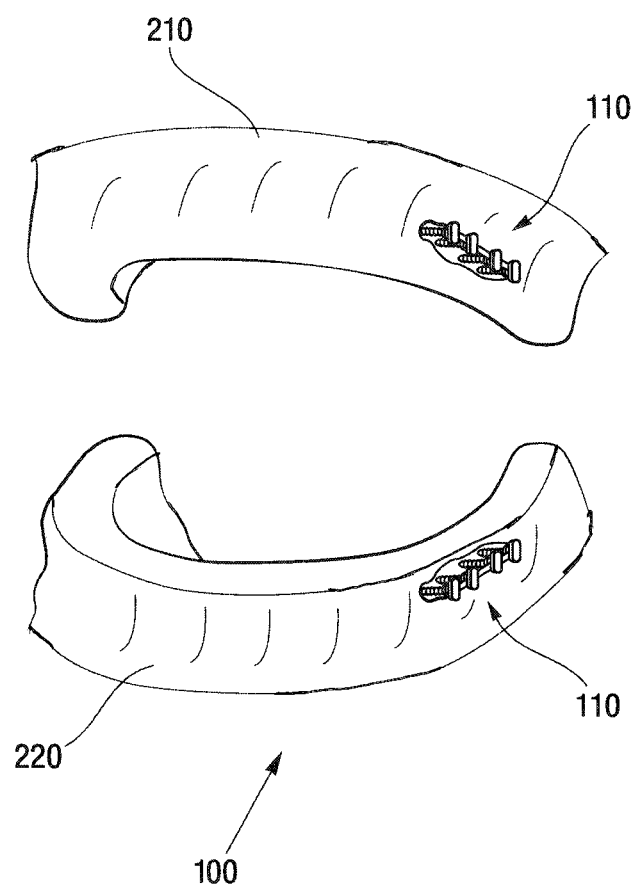
FIG. 1 shows a perspective view of an aspect of the apparatus of the present invention, in relation to a patient, before the horizontal implants are implanted on the patient.
Figure 2:
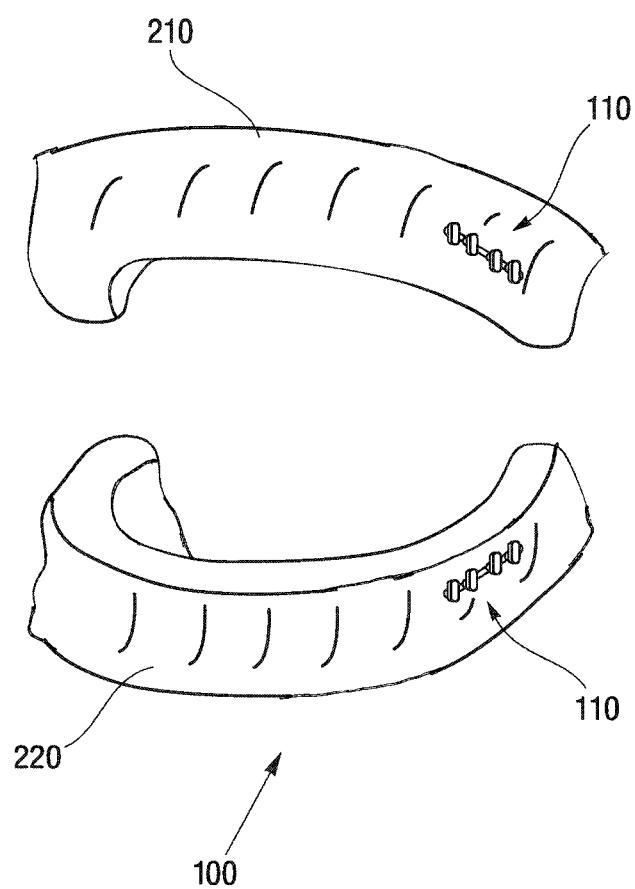
FIG. 2 shows a perspective view of an aspect of the apparatus of the present invention, in relation to a patient, after the horizontal implants are implanted on the patient.
Figure 3:
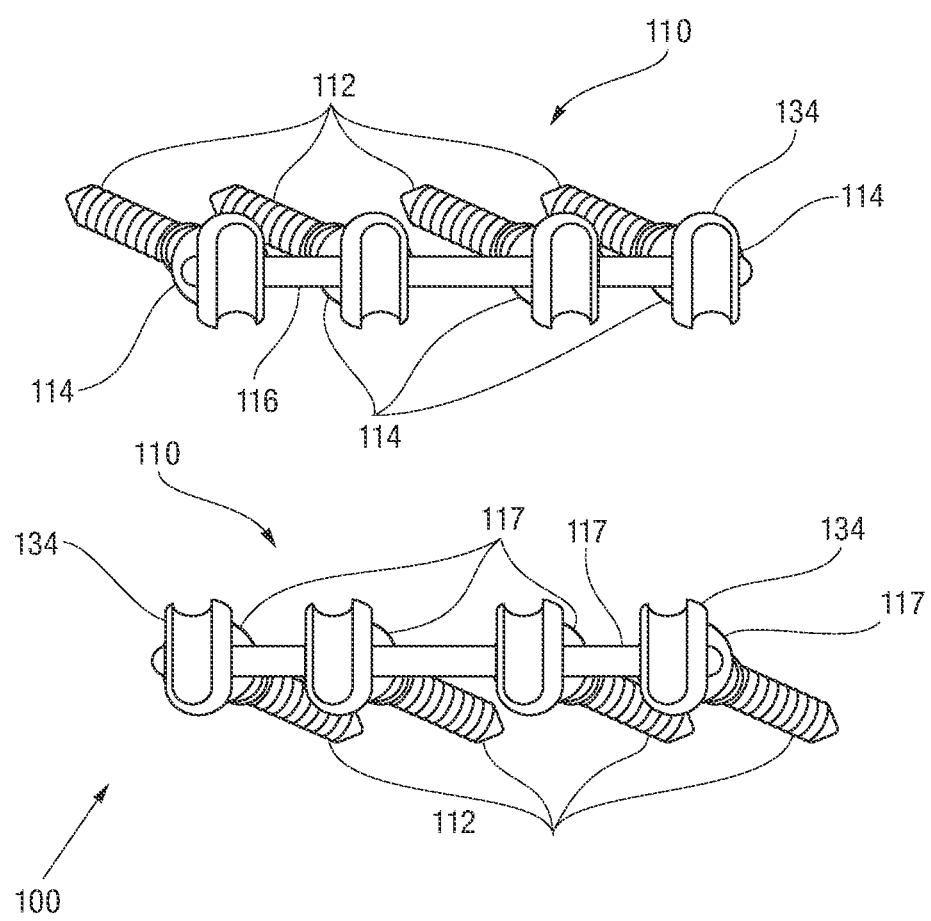
FIG. 3 shows two horizontal implants of an aspect of the present invention.
Figure 4:
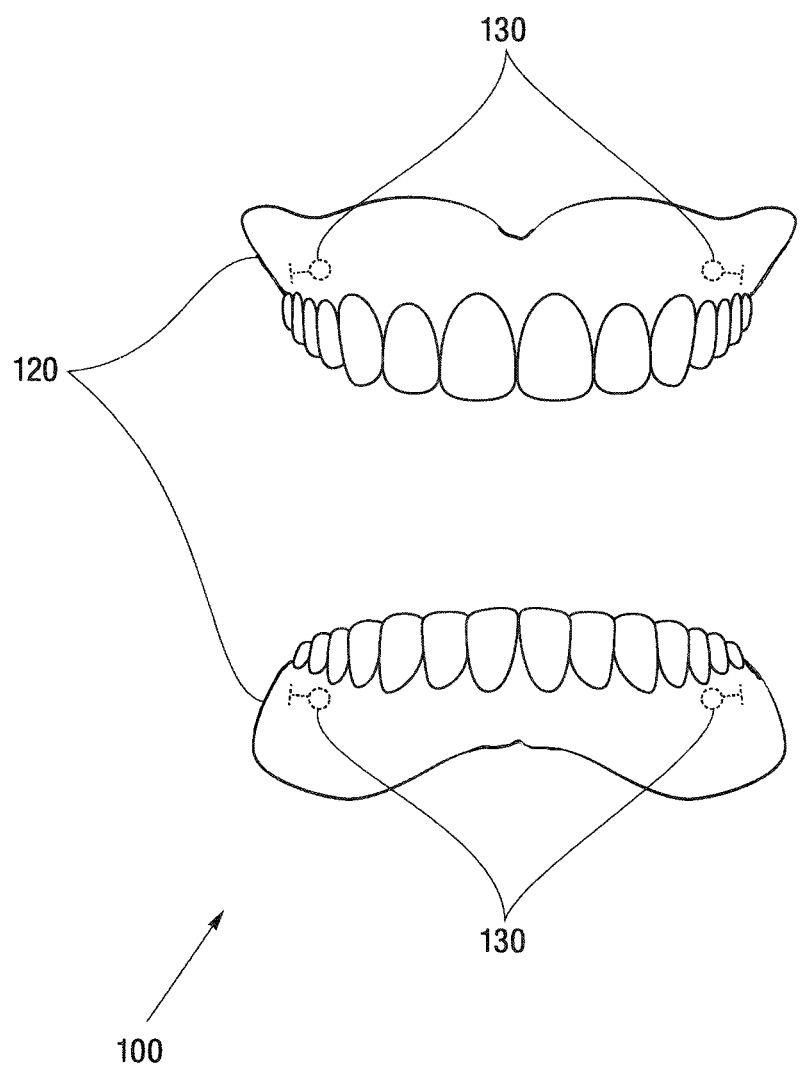
FIG. 4 shows a front elevation view of an aspect of the overdenture of the present invention.
Figure 5:
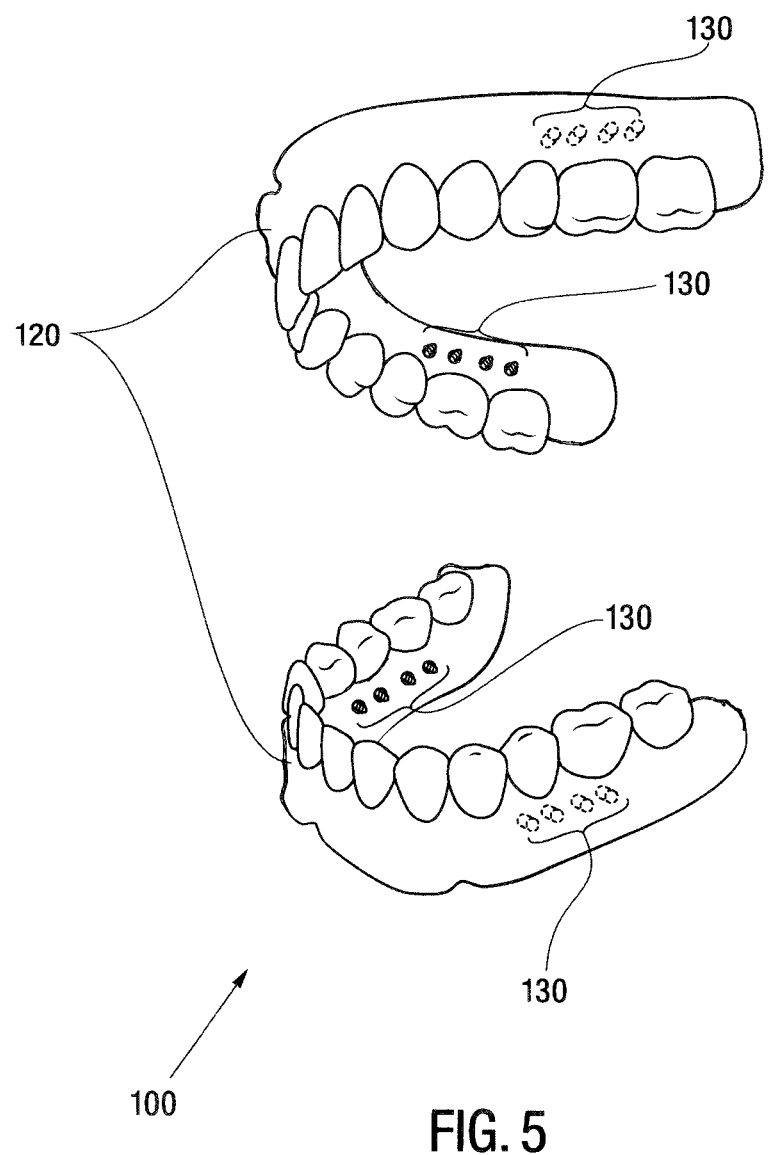
FIG. 5 shows a perspective view of an aspect of the overdenture of the present invention.
Figure 6A:
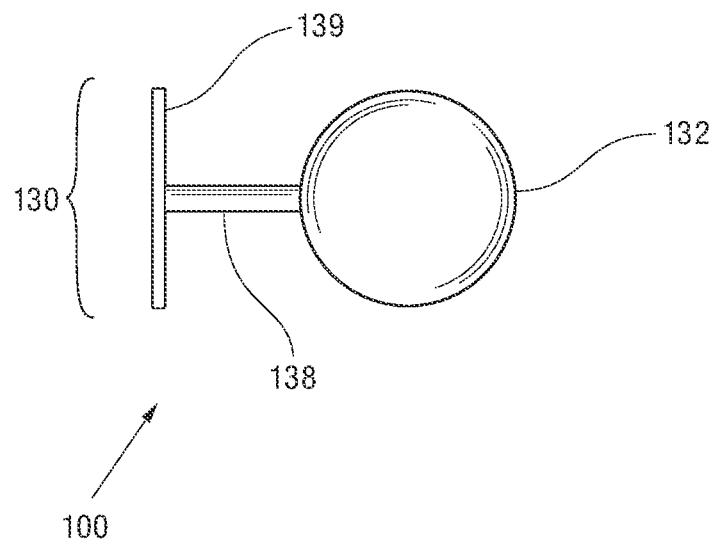
FIG. 6A and FIG. 6B show side elevation views of aspects of attachment components of the present invention.
Figure 6B:
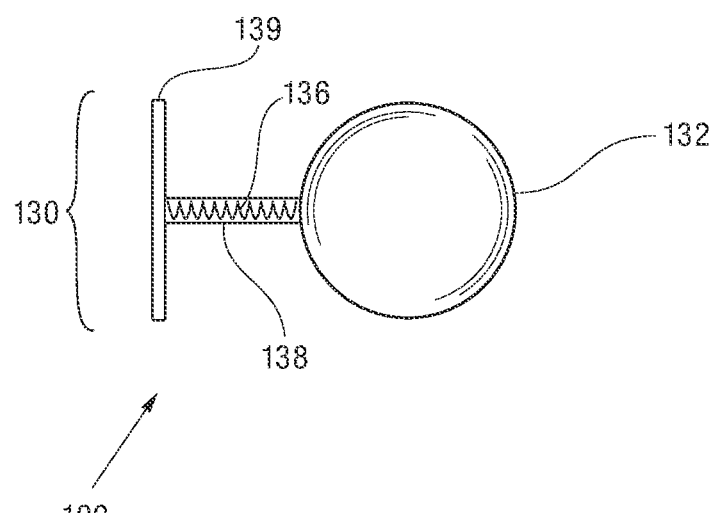
Figure 7A:
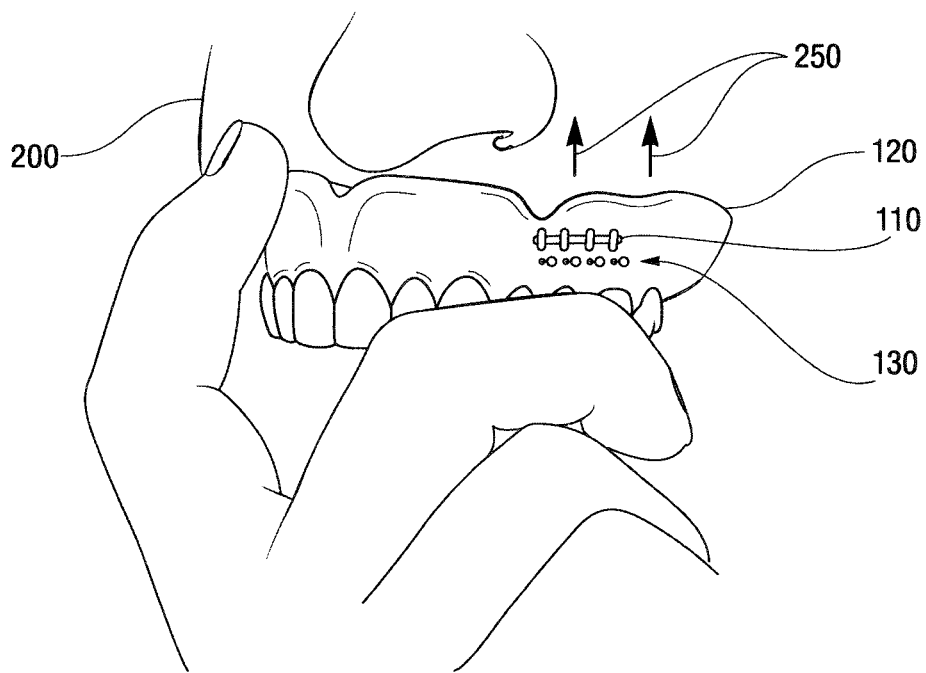
FIG. 7A and FIG. 7B show elevation views of an aspect of an overdenture of the present invention being implanted into place on a patient with a horizontal implant implanted.
Figure 7B:
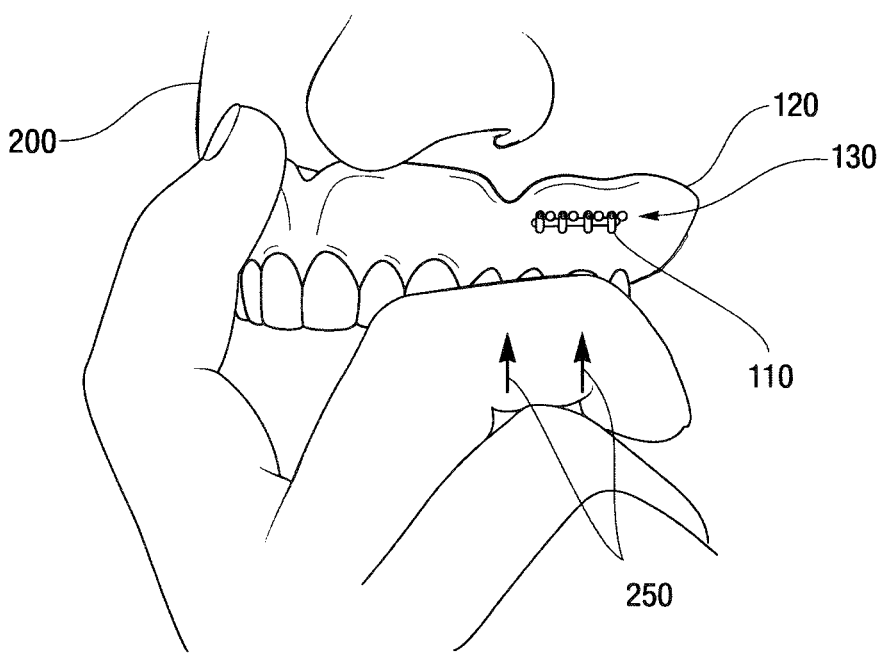

The ball components 132 may have an elastic attachment 136, including but not limited to a spring, connecting them to the overdenture 120, wherein the elastic attachment 136 in some aspects of the apparatus 100 is disposed to be passed through a handle 138 which is hollow. In other aspects, a handle 138 may be solid. The plurality of overdenture-attachment components 130 may, in some aspects, comprise attachment means other than the ball components 132, which attachment means may be attached in some aspects with a handle 138, with an elastic attachment 136, and/or with other elements now known or later invented. Without limiting the foregoing, the overdenture-attachment components 130 may appear more like cylinders or posts, as depicted in FIG. 5, or may have a ball components 132 or similar element integrated tightly with a handle 138 or similar element. Each handle 138 may be attached directly to an overdenture 120 or each handle 138 may be attached to an anchor 139 which is attached to an overdenture 120; each of the plurality of the handles 138 may be attached or assembled differently, even on an instance of an overdenture 120. The plurality of overdenture-attachment components 130 in an instance of an overdenture 120 are not all necessarily the same as each other, as a plurality of manufactures, meaning forms, types, functions, or styles, of overdenture-attachment components 130 can be used within an instance of an overdenture 120.

With reference to FIG. 1, FIG. 2, FIG. 7A, FIG. 7B, FIG. 8A, FIG. 8B, FIG. 9A, and FIG. 9B, the apparatus 100 may be used with a patient 200, by implanting one or more of the horizontal implant 110 into a maxilla 210 or a mandible 220 of the patient 200. When implanted into a maxilla 210, the implant-attachment components 134 should be oriented so that the overdenture 120 can be snapped, or slid together to engage them, or otherwise affixed to them, using the ball components 132, i.e. the implant-attachment components 134 should be oriented so that they can be reversibly engaged with the overdenture-attachment components 130. Similarly, when implanted into a mandible 220, the implant-attachment components 134 should be oriented so that the overdenture 120 can be snapped, or slid together to engage them, or otherwise affixed to them, using the ball components 132, i.e. the implant-attachment components 134 should be oriented so that they can be reversibly engaged with the overdenture-attachment components 130. The overdenture 120 of the present invention may be for a partial or complete replacement of teeth on either the maxilla 210 or the mandible 220, or on both of the maxilla 210 and the mandible 220, i.e. the overdenture 120 may be a partial overdenture 120b or a complete overdenture 120a. FIG. 7A, FIG. 7B, FIG. 8A, FIG. 8B, FIG. 9A, and FIG. 9B further demonstrate how the patient 200 may talk and chew using the apparatus 100.

The apparatus 100 comprises a horizontally-placed dental implant, the horizontal implant 110. The apparatus 100, in most cases, doesn't require a bone graft, and can offer advantages for patients 200 with resorbed ridges. The apparatus can also help rebuild the bone (maxilla 210 or mandible 220), and/or help prevent further bone resorption. The apparatus 100 can be used with patients 200 with tori.

The overdenture 120 may comprise acrylic, or valplast, or other denture materials now known or later invented. The overdenture 120 may be customized to a patient 200, including but not limited to the number of horizontal implants 110, the number of posts 112 in each of any number of horizontal implants 110, and a horizontal or other extent of the overdenture 120 used for the patient 200.

The apparatus 100 can require less healing time than prior art devices, and the apparatus 100 does not require palatal coverage, which offers an advantage to patients 200 in that the patient 200 will be able to eat and taste better. The apparatus 100 presents improvements in patient comfort when eating, because patients 200 will not need to bite directly onto the bone in the same way as with prior art dental implants and overdenture. Additionally, because of the components for attaching overdenture 120 that may be used with the horizontal implant 110, namely the ball components 132 and the implant-attachment components 134, the overdenture 120 can move with the movement 230 of the patient's mouth in chewing and biting a food item 260 without direct force on the horizontal implant 110, as depicted in FIG. 8A and FIG. 8B, leading to advantages in patient 200 comfort and use, as a plurality of occlusion forces 240 are transmitted from the maxilla 210 and/or mandible 220 (wherever a patient 200 has a horizontal implant 110 implanted) through the horizontal implant 110 (from posts 112 to the plurality of post-connection components, e.g. bar 116 or plate 117, and implant-attachment components 134, whether affixed to the plate 117 or through the holes 118 in the plate 117 to the posts 112) to the ball components 132 and the overdenture-attachment components 130, and thus to the overdenture 120. One aspect of the present apparatus that provides advantages over the prior art is that the rotating or sliding movement of the ball components 132 in, and relative to, the implant-attachment components 134 will not lead to the plurality of occlusion forces 240 being directly transmitted to the posts 112 of the horizontal implant 110 imbedded in the bones (maxilla 210, mandible 220, or conceivably other bones) of the patient 200, because the plurality of occlusion forces 240 are transmitted through the multiple components of the horizontal implant 110 as described herein. Furthermore, the plurality of post-connection components spread the occlusion forces 240 over multiple of the plurality of posts 112, lessening the force exerted on the maxilla 210 or mandible 220 of the patient 200 and therefore reducing the risks of pain or of injury, providing improvements over the prior art.

In some aspects of the apparatus 100, the ball components 132 and the implant-attachment components 134 connect to each other in a manner that is both mechanically secure, and magnetically, such that the ball components 132 and the implant-attachment components 134 are magnetically attracted to each other and are reversibly secured to each other via magnetism. The horizontal implant 110 and the overdenture 120, by being reversibly secured to each other via magnetism, present a wider profile than some prior art overdentures, but because the horizontal implant 110 may, for a patient 200 for whom the overdenture 120 replaces teeth on either or both sides of the maxilla 210 or mandible 220 of the patient 200, be placed only on the sides of the bones of the patient 200, as opposed to in the anterior of the mouth of the patient 200, the overdenture 120 and apparatus 100 as a whole present further advantages over prior art in that the patient 200 can speak, look, and talk more normally, that is, like a person who does not have dentures. The horizontal implant 110 may be applied to a curved region of the maxilla 210 and/or of the mandible 220, especially over a region with bone resorption. With reference to FIG. 7A, FIG. 7B, FIG. 9A, and FIG. 9B, any of the overdenture 120 (a complete overdenture 120a or a partial overdenture 120b) is inserted onto the patient 200, that is onto either the maxilla 210 or mandible 220, with a reversible engage-disengage movement 250 that engages the overdenture-attachment components 130 with the horizontal implant 110. The reversible engage-disengage movement 250 may be repeatedly used to insert an overdenture 120 or to remove an overdenture 120. While the horizontal implant 110 may comprise titanium, the implant-attachment components 134 may comprise stainless steel. The implant-attachment components 134 may have approximate dimensions of length (top-to-bottom) of 4-6 mm, width of 2-3 mm, and depth of 1-2 mm; it will be apparent to one of skill in the art that other dimensions may be desirable. A distance between each of the plurality of posts 112 of a horizontal implant is approximately 2-3 mm. A horizontal implant 110 may be approximately 17 mm in its largest extent, along the maxilla 210 or the mandible 220, though that will depend on the number of posts 112 that comprise that instance of a horizontal implant 110. The ball components 132 should be approximately spheres, of approximately 1-3 mm in diameter, such that the ball components 132 fit snugly with the implant-attachment components 134. Each handle 138 is approximately 1-2 mm in length, though other dimensions may be desirable. The number of posts 112, number of ball components 132, and number of implant-attachment components 134 will depend on the needs of the patient 200, and is not to be limited by any fixed number or depiction in the foregoing description or in the patent illustrations.

Certain aspects of the present invention were described above. From the foregoing it will be seen that this invention is one well adapted to attain all the ends and objects set forth above, together with other advantages, which are obvious in and inherent to the inventive apparatus disclosed herein. It will be understood that certain features and sub-combinations are of utility and may be employed without reference to other features and sub-combinations. It is expressly noted that the present invention is not limited to those aspects described above, but rather the intention is that additions and modifications to what was expressly described herein are also included within the scope of the invention. Moreover, it is to be understood that the features of the various aspects described herein are not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

Accordingly, what is claimed is:

1. A dental prosthetic device comprising:
a plurality of horizontal implants each comprising a plurality of horizontal posts configured to be inserted horizontally in a labial and/or buccal surface of a patient's bone;
a plurality of overdentures comprising overdenture attachment components, the overdenture attachment components extending inward along a longitudinal axis thereof in a buccal/lingual direction, from a side surface of the overdenture toward the labial and/or buccal surface of the patient's bone;
a plurality of horizontal post-connection components, wherein the plurality of post connection components connect at least some of the plurality of horizontal posts together, the plurality of post connection components configured to extend approximately horizontally following the labial and/or buccal surface of the patient's bone; and
a plurality of implant attachment components affixed to the plurality of horizontal implants at the plurality of horizontal post connection components along the labial and/or buccal surface of the patient's bone;
wherein the plurality of overdentures are configured to be coupled and uncoupled to the plurality of horizontal implants via a removable connection between the overdenture attachment components and the implant attachment components at the labial and/or buccal side of the patient's bone surface.

2. The dental prosthetic device of claim 1, wherein the horizontal post-connection components comprise a plurality of horizontal plates each having a plurality of holes, wherein the horizontal plates extend external to and approximately parallel to the labial and/or buccal surface of the patient's bone surface, and in which each post of the plurality of horizontal posts in a horizontal implant is passed through one of the plurality of holes of one of the horizontal plates and attached to the implant attachment components.

3. The dental prosthetic device of claim 2, wherein the overdenture attachment components comprise horizontally oriented ball components, with each of a plurality of ball components affixed to the overdenture with a horizontal handle, extending inward along the longitudinal axis in the buccal/lingual direction from the side surface of the overdenture toward the labial and/or buccal surface of the patient's bone and the horizontal implant.

4. The dental prosthetic device of claim 3, wherein the plurality of implant attachment components comprise socket components that couple with the horizontally oriented ball components, forming the removable connection.

5. The dental prosthetic device of claim 3, wherein each of the plurality of horizontally oriented ball components have an elastic attachment connecting each of the plurality of horizontally oriented ball components to the overdenture.

6. The dental prosthetic device of claim 5, wherein the elastic attachment is disposed to be passed through the horizontal handle, and wherein the horizontal handle is hollow.

7. The dental prosthetic device of claim 3, wherein each horizontal handle is attached directly to the overdenture.

8. The dental prosthetic device of claim 3, wherein each horizontal handle is attached to an anchor, and wherein the anchor is attached to the overdenture.

9. The dental prosthetic device of claim 3, wherein;
the plurality of implant attachment components have approximate dimensions of length of 4-6 mm, width of 2-3 mm and depth of 1-2 mm;
a distance between each of the plurality of posts is approximately 2-3 mm;
each horizontal implant is approximately 17 mm in its largest extent; and
the horizontally oriented ball components are approximately spheres, of approximately 1-3 mm in diameter; and each handle is approximately 1-2 mm in length.

10. The dental prosthetic device of claim 3, wherein the horizontally oriented ball components and the implant attachment components connect to each other in a manner that is both mechanically secure, and magnetically, such that the horizontally oriented ball components and the implant attachment components are magnetically attracted to each other and are reversibly secured to each other via magnetism.

11. The dental prosthetic device of claim 3, wherein a chewing movement of a mouth of the patient moves the overdenture without direct force on the posts of the horizontal implants, as the movement of the ball components in the implant attachment components transmit a plurality of occlusion forces through the components of the prosthetic device.

12. The dental prosthetic device of claim 2, wherein the overdenture attachment components comprise attachment means, and wherein the attachment means are attached with a horizontal handle to the overdenture, extending inward along the longitudinal axis in the buccal/lingual direction from the side surface of the overdenture toward the labial and/or buccal surface of the patient's bone and the horizontal implant.

13. The dental prosthetic device of claim 2, wherein the overdenture attachment components comprise a plurality of types of overdenture attachment components.

14. The dental prosthetic device of claim 1, wherein the plurality of overdentures comprise a plurality of partial overdentures or a plurality of complete overdentures.

15. The dental prosthetic device of claim 1, wherein each of the plurality of overdentures is configured to be customized to the patient by varying the number of horizontal implants and the number of horizontal posts used in the prosthetic device.

16. The dental prosthetic device of claim 15, wherein a horizontal extent of the plurality of overdentures depends on the number of implants and posts used, and wherein the horizontal extent means the size of the overdenture in the dimension along or parallel to the labial and/or buccal surface of the patient's bone.

17. The dental prosthetic device of claim 1, wherein the plurality of horizontal implants are configured to be placed only on the labial and/or buccal sides of the patient's bone surface, the bone surface being the labial and/or buccal surface of the mandible or maxilla.

* * * * *